United States Patent
Seo

(10) Patent No.: US 9,844,086 B2
(45) Date of Patent: Dec. 12, 2017

(54) METHOD FOR RESOURCE ALLOCATION FOR DEVICE-TO-DEVICE DIRECT COMMUNICATION IN WIRELESS COMMUNICATION SYSTEM, AND APPARATUS THEREFOR

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/912,877

(22) PCT Filed: Sep. 5, 2014

(86) PCT No.: PCT/KR2014/008377
§ 371 (c)(1),
(2) Date: Feb. 18, 2016

(87) PCT Pub. No.: WO2015/034310
PCT Pub. Date: Mar. 12, 2015

(65) Prior Publication Data
US 2016/0205713 A1 Jul. 14, 2016

Related U.S. Application Data

(60) Provisional application No. 61/874,344, filed on Sep. 5, 2013, provisional application No. 61/935,799, filed (Continued)

(51) Int. Cl.
*H04W 76/02* (2009.01)
*H04L 1/18* (2006.01)
(Continued)

(52) U.S. Cl.
CPC ......... *H04W 76/023* (2013.01); *H04L 1/1861* (2013.01); *H04L 5/14* (2013.01); *H04W 72/0446* (2013.01)

(58) Field of Classification Search
None
See application file for complete search history.

(56) References Cited

U.S. PATENT DOCUMENTS

2013/0083779 A1* 4/2013 Ahn .................. H04W 72/04
370/336
2013/0225184 A1 8/2013 Liu et al.
(Continued)

FOREIGN PATENT DOCUMENTS

KR 10-0969805 7/2010
KR 10-2011-0051583 5/2011
(Continued)

OTHER PUBLICATIONS

PCT International Application No. PCT/KR2014/008377, Written Opinion of the International Searching Authority dated Dec. 18, 2014, 16 pages.
(Continued)

*Primary Examiner* — Kodzovi Acolatse
(74) *Attorney, Agent, or Firm* — Lee Hong Degerman Kang Waimey

(57) ABSTRACT

Disclosed is a method for transmitting signals for a device-to-device (D2D) link at a user equipment (UE) in a wireless communication system. Specifically, the method comprises receiving a synchronization signal for the D2D link in a reference subframe, receiving a subframe bitmap indicating a plurality of subframes for the D2D link, and transmitting D2D link signals on at least one of D2D subframes determined using the information on the reference subframe and the subframe bitmap, wherein the synchronization signal is received with information on the reference subframe.

10 Claims, 9 Drawing Sheets

Related U.S. Application Data on Feb. 4, 2014, provisional application No. 62/017,228, filed on Jun. 25, 2014.

(51) Int. Cl.
*H04L 5/14* (2006.01)
*H04W 72/04* (2009.01)

(56) References Cited

U.S. PATENT DOCUMENTS

| | | | | |
|---|---|---|---|---|
| 2014/0242963 A1* | 8/2014 | Novlan | ............... | H04W 48/16 |
| | | | | 455/418 |
| 2014/0328329 A1* | 11/2014 | Novlan | ............... | H04W 72/042 |
| | | | | 370/336 |
| 2015/0055579 A1* | 2/2015 | Wu | ............... | H04L 1/1867 |
| | | | | 370/329 |

FOREIGN PATENT DOCUMENTS

| KR | 10-2012-0035106 | 4/2012 |
|---|---|---|
| KR | 10-2012-0074254 | 7/2012 |
| WO | 2012/081798 | 6/2012 |
| WO | 2013077684 | 5/2013 |

OTHER PUBLICATIONS

European Patent Office Application Serial No. 14842254.6, Search Report dated Mar. 27, 2017, 8 pages.

* cited by examiner

FIG. 2
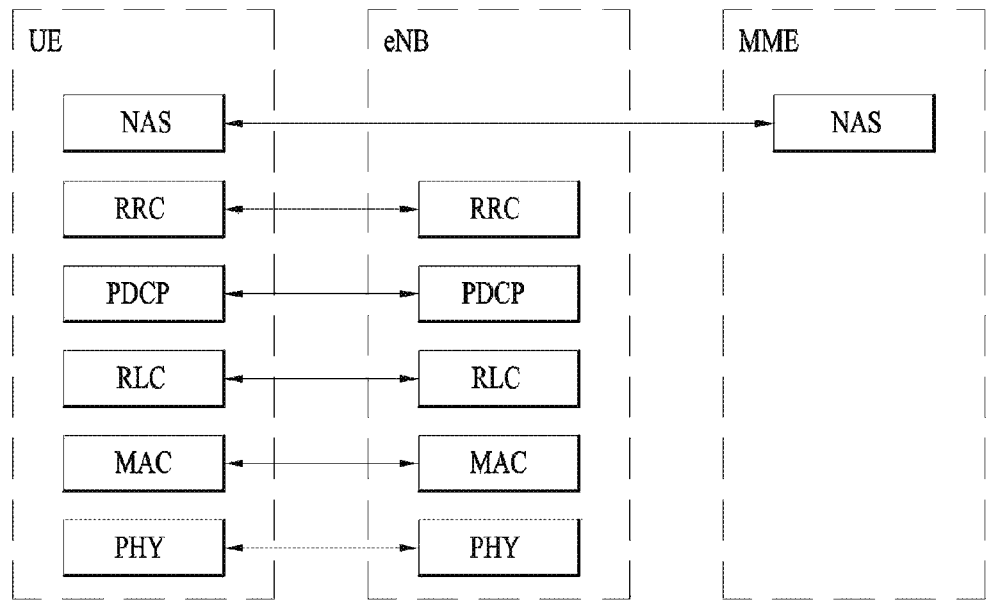
(a) CONTROL-PLANE PROTOCOL STACK
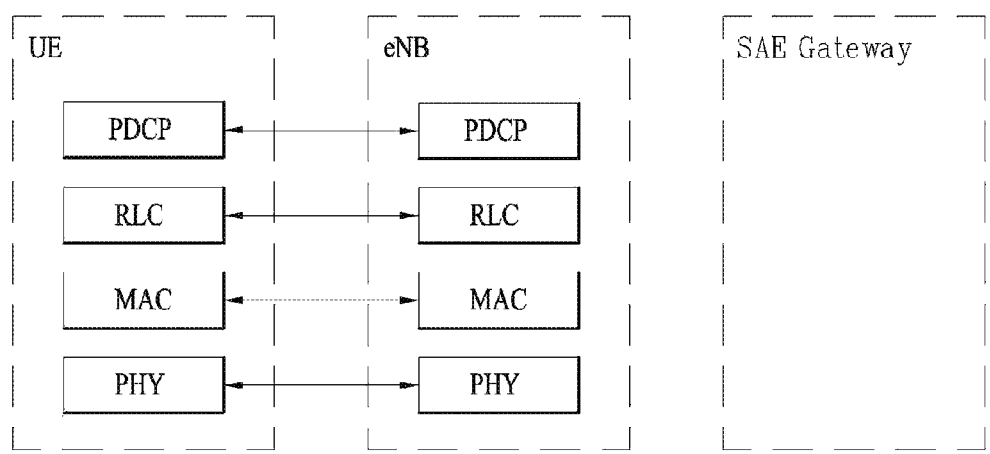
(b) USER-PLANE PROTOCOL STACK

METHOD FOR RESOURCE ALLOCATION FOR DEVICE-TO-DEVICE DIRECT COMMUNICATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/008377, filed on Sep. 5, 2014, which claims the benefit of U.S. Provisional Application No. 61/874,344, filed on Sep. 5, 2013, 61/935,799, filed on Feb. 4, 2014 and 62/017,228, filed on Jun. 25, 2014, the contents of which are all hereby incorporated by reference herein in their entirety.

TECHNICAL FIELD

The present invention relates to a wireless communication system and, more specifically, to a resource allocation method for device-to-device direct communication in a wireless communication system and an apparatus for the same.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a resource allocation method for device-to-device direct communication in a wireless communication system and an apparatus for the same.

Technical Solution

In an aspect of the present invention, a method for indicating, by a user equipment (UE), a subframe for device-to-device direct communication in a wireless communication includes: transmitting, to a plurality of UEs, resource configuration information including subframe indication bitmap information for device-to-device direct communication, defined in a predetermined bit size, offset information for applying the subframe indication bitmap information and information regarding the number of times of applying the subframe indication bitmap information; and performing scheduling for the plurality of UEs such that device-to-device direct communication is performed in at least one of subframes for device-to-device direct communication, indicated by the resource configuration information, wherein the subframes for device-to-device direct communication are indicated by repeatedly applying the subframe indication bitmap by the number of times of applying the subframe indication bitmap information, on the basis of a reference subframe determined by applying the offset information to a specific subframe.

The specific subframe may be a subframe in which the UE transmits a synchronization reference signal to the plurality of UEs.

In another aspect of the present invention, a method for performing device-to-device direct communication by a UE in a wireless communication includes: receiving, from a cluster head, resource configuration information including subframe indication bitmap information for device-to-device direct communication, defined in a predetermined bit size, offset information for applying the subframe indication bitmap information and information regarding the number of times of applying the subframe indication bitmap information; receiving, from the cluster head, scheduling information instructing device-to-device direct communication to be performed in at least one of subframes for device-to-device direct communication, indicated by the resource configuration information; and performing device-to-device direct communication on the basis of the scheduling information, wherein the subframes for device-to-device direct communication are indicated by repeatedly applying the subframe indication bitmap by the number of times of applying the subframe indication bitmap information, on the basis of a reference subframe determined by applying the offset information to a specific subframe.

The specific subframe may be a subframe in which a synchronization reference signal is received from the cluster head.

The predetermined bit size may be determined on the basis of an uplink hybrid automatic repeat and request (HARQ) period of device-to-device direction communication.

The subframe indication bitmap information may indicate a subframe for device-to-device direct communication from among uplink subframes indicated by an uplink/downlink subframe configuration applied to the wireless communication system, when the wireless communication system is a time division duplex (TDD) system. The uplink subframes indicated by the uplink/downlink subframe configuration may be defined on the basis of a plurality of radio frames.

Advantageous Effects

According to embodiments of the present invention, it is possible to efficiently assign resources to device-to-device direct communication in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE

Figure 1:
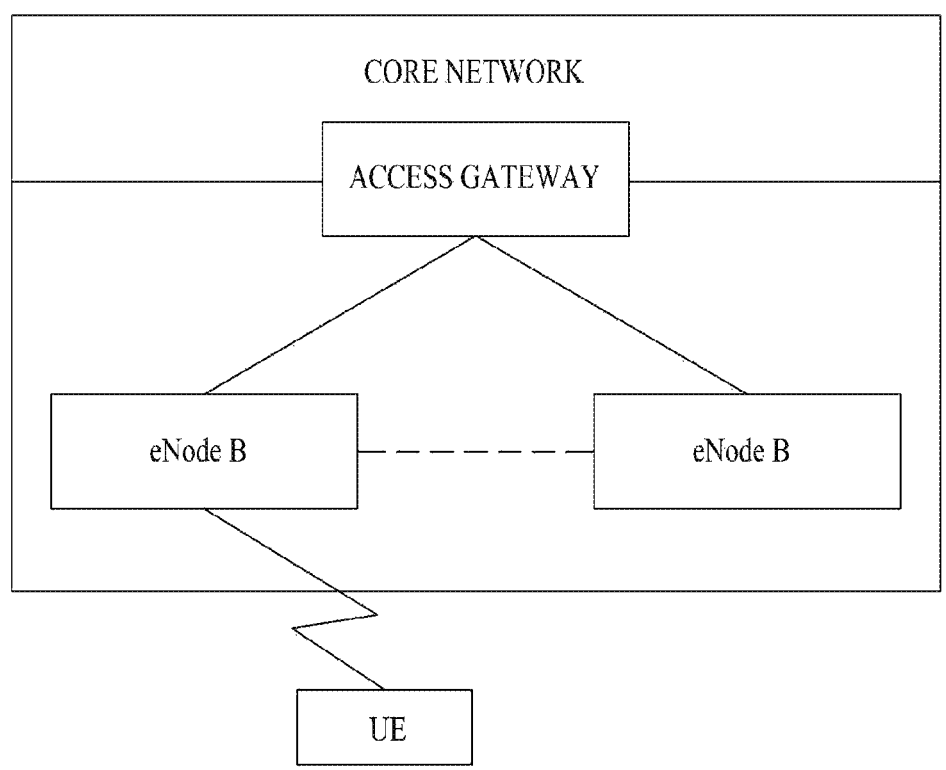
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
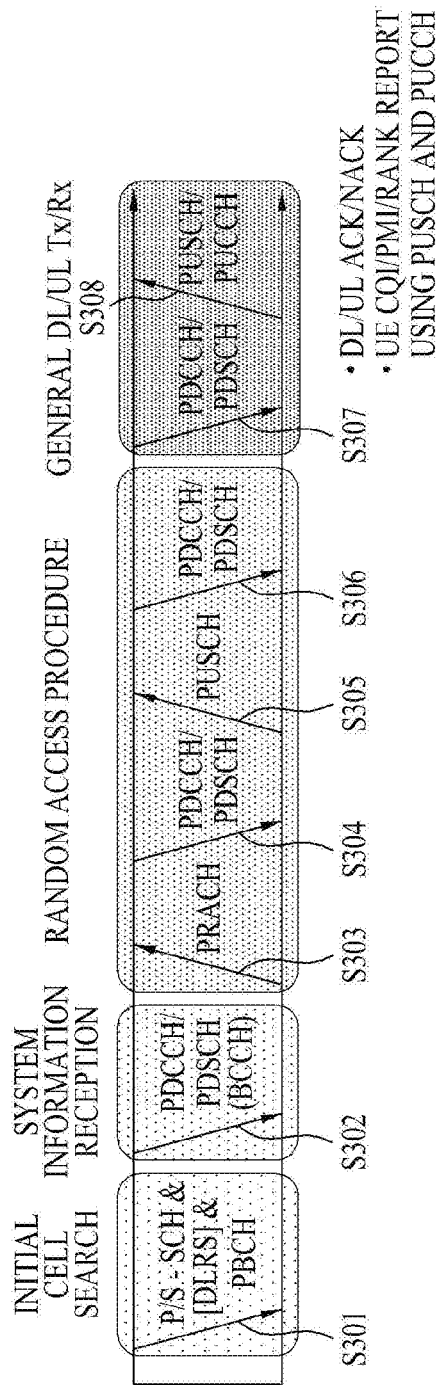
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
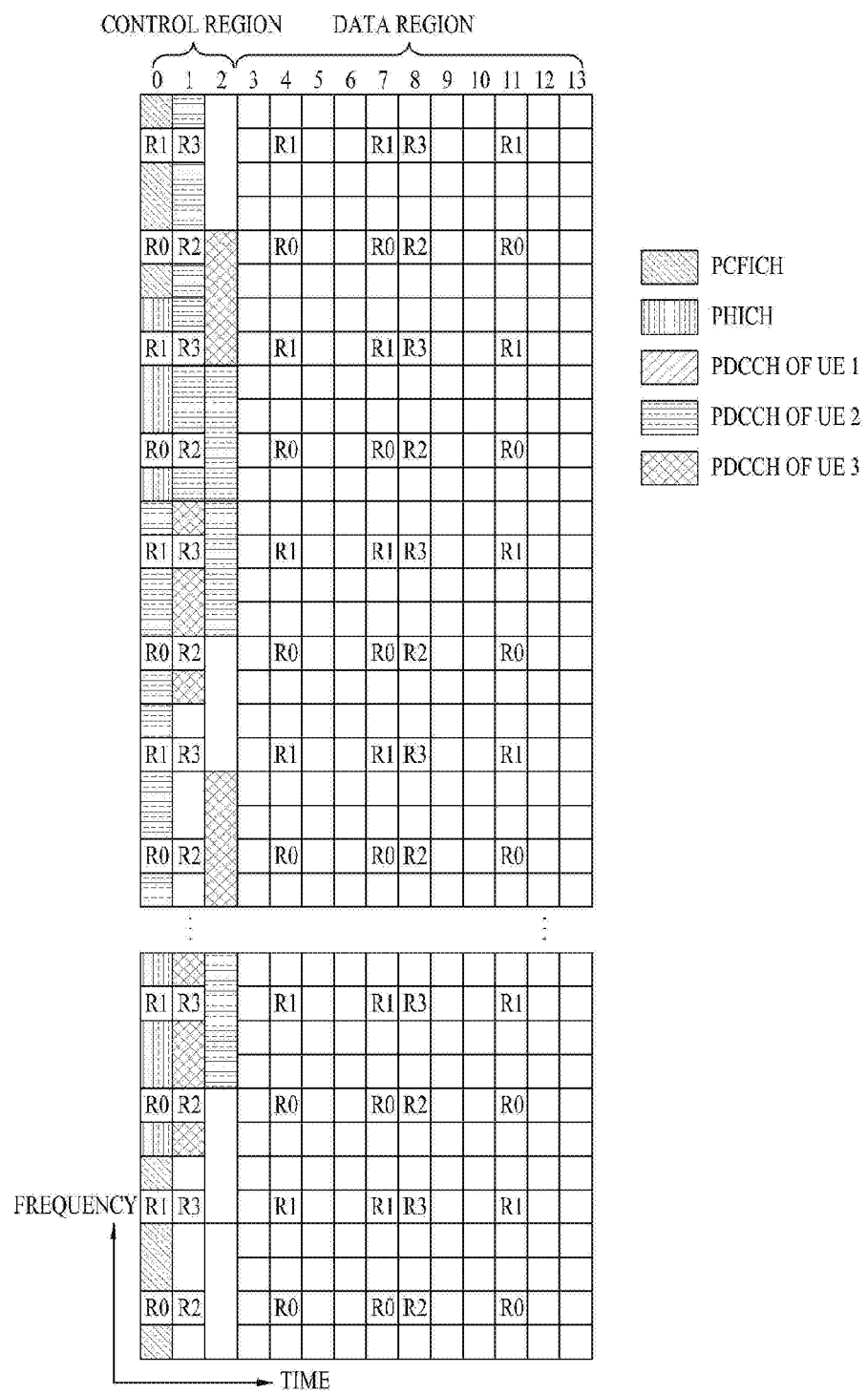
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
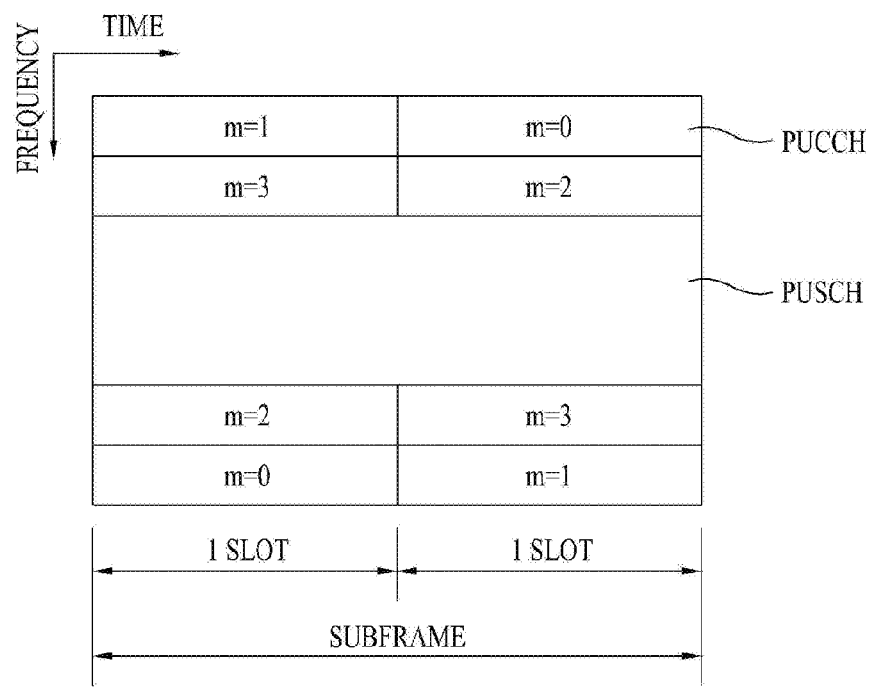
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH. A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
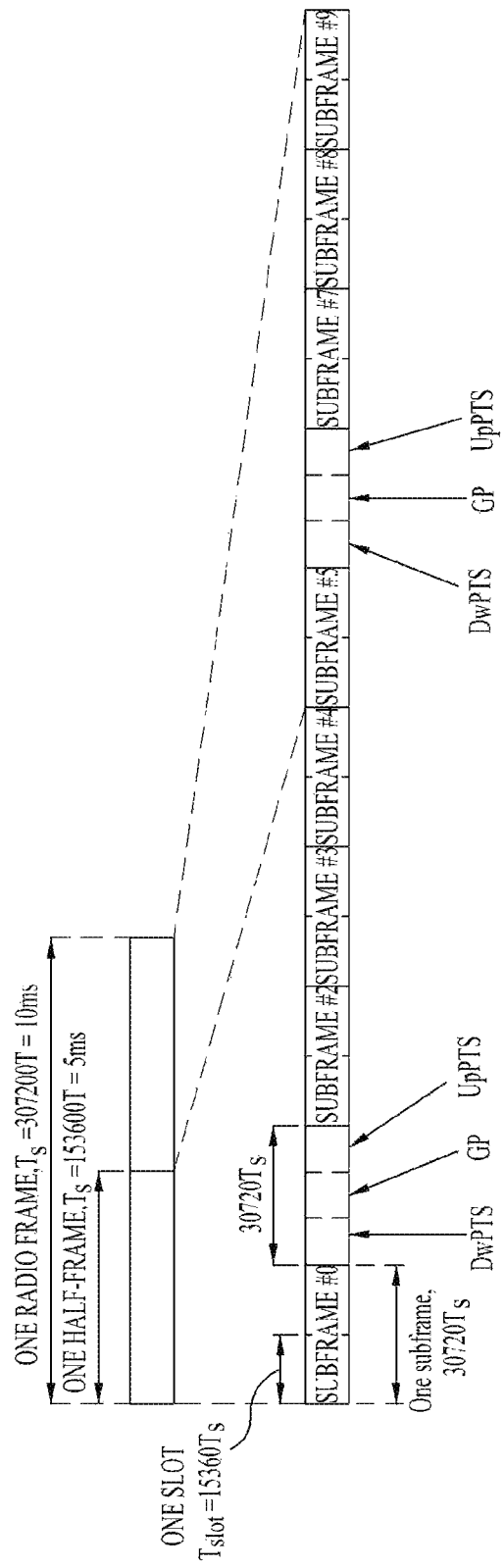
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Currently, in an LTE TDD system, the special subframe is configured as a total of 10 configurations as shown in Table 1 below. Table 1 shows DwPTS and UpPTS when $T_S=1/(15000 \times 2048)$. The region other than DwTPS and UpPTS is set to a guard period.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D, U, and S refer to a downlink subframe, an uplink subframe, and the special subframe. In addition, Table 2 also shows downlink-to-uplink switch-point periodicity in an uplink/downlink subframe configuration in each system.

The number of synchronous UL HARQ processes per uplink/downlink subframe configuration in the TDD system is shown in Table 3.

TABLE 3

| TDD UL/DL configuration | Number of HARQ processes for Normal HARQ operation |
|---|---|
| 0 | 4 |
| 1 | 7 |
| 2 | 10 |

TABLE 3-continued

| TDD UL/DL configuration | Number of HARQ processes for Normal HARQ operation |
|---|---|
| 3 | 9 |
| 4 | 12 |
| 5 | 15 |
| 6 | 6 |

Table 4 shows a PHICH timeline per uplink/downlink subframe configuration. In Table 4, if a UE has transmitted a PUSCH in subframe #n on the basis of uplink scheduling information, i.e., an uplink grant, received from an eNB, the UE receives a PHICH associated with the PUSCH in subframe #(n+$k_{PHICH}$) where $k_{PHICH}$ is shown in Table 4.

TABLE 4

| TDD UL/DL Configuration | Subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Table 5 shows a PUSCH (re)transmission timeline. PUSCH (re)transmission timing of the UE is determined on the basis of the following conditions 1) to 4).

1) In UL/DL subframe configurations #1 to #6, if a PDCCH (i.e. uplink grant) and/or a PHICH are detected in subframe #n, a PUSCH corresponding thereto is transmitted or retransmitted in subframe #(n+k). Here, k is shown in Table 5.

2) In UL/DL subframe configuration #0, if a PDCCH (i.e. uplink grant) and/or a PHICH are detected in subframe #n and the most significant bit (MSB) of the UL index of the uplink grant is 1 or the PHICH is received in subframe #0 or subframe #5 in a resource corresponding to $I_{PHICH}=0$, a corresponding PUSCH is transmitted or retransmitted in subframe #(n+k). Here, k is shown in Table 5.

3) In UL/DL subframe configuration #0, if the least significant bit (LSB) of the UL index of the uplink grant is 1, a PHICH is received in subframe #0 or subframe #5 in a resource corresponding to $I_{PHICH}=1$ or the PHICH is received in subframe #1 or subframe #6, a corresponding PUSCH is transmitted or retransmitted in subframe #(n+7).

4) In UL/DL subframe configuration #0, if the MSB and LSB of the UL index of the uplink grant are 1, a corresponding PUSCH is transmitted or retransmitted in subframe #(n+k) and subframe #(n+7). Here, k is shown in Table 5.

TABLE 5

| TDD UL/DL Configuration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 6 shows a UL ACK/NACK timeline. Referring to Table 6, if the UE receives a PDCCH and a PDSCH scheduled by the PDCCH from the eNB in subframe #(n−k), the UE transmits UL ACK/NACK for the received PDSCH in subframe #n.

TABLE 6

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 7:
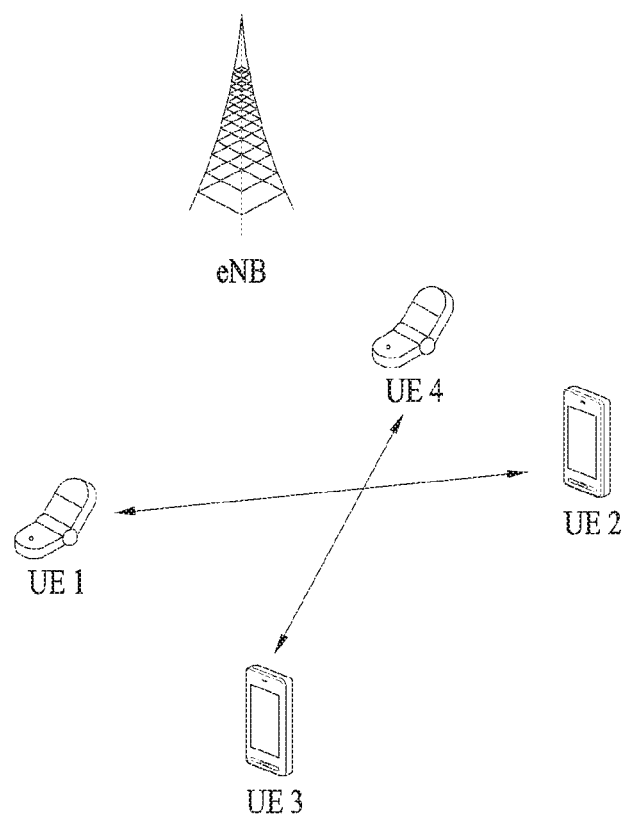
FIG. 7 is a diagram illustrating the concept of device-to-device (D2D) communication.

FIG. 7 shows the concept of D2D communication.

Referring to FIG. 7, UE1 and UE2 perform device-to-device direct communication and UE3 and UE4 perform device-to-device direct communication. An eNB can control positions of time/frequency resources, transmit power and the like for direct communication between UEs through appropriate control signals. However, when UEs are located outside of the coverage of the eNB, the UEs may be configured to perform direct communication therebetween without a control signal of the eNB. In the following description, device-to-device direct communication between UEs is referred to as D2D (device-to-device) communication.

For a UE located inside of the coverage of the eNB, the eNB preferably designates positions of time and frequency resources to be used for D2D communication in order to allow a conventional eNB-UE link and a D2D communication link to smoothly coexist by separately managing resources of the conventional eNB-UE link and D2D resources. A similar resource allocation structure may be applied to UEs located outside of the coverage of the eNB. This means that a specific UE designates positions of time and frequency resources to be used for D2D communication like the eNB and another UE recognizes the designated resource positions and performs appropriate D2D signal transmission and reception operations.

In the following description, it is assumed that UEs which perform D2D communication are grouped into a single cluster and a specific UE is selected as a cluster head which designates resources of D2D communication for other UEs. Here, a UE which is assigned a D2D resource position by the cluster head and performs D2D transmission or reception is referred to as a cluster member of the corresponding cluster.

Particularly, a single UE may belong to one or more clusters. That is, a single UE may become a member of multiple clusters. This means that a single UE can be assigned resources for D2D communication by multiple cluster heads. In addition, the cluster head can be determined through various methods. For example, UEs can operate to stochastically select themselves as cluster heads upon determining that there is no cluster head adjacent thereto. Alternatively, a UE which transmits a D2D signal, particularly, a UE which transmits a broadcast signal or a groupcast signal received by a plurality of UEs may operate to always become a cluster head. In this case, UEs which receive the broadcast signal or groupcast signal transmitted by the UE may be regarded as UEs belonging to the corresponding cluster.

As described above, even a UE located inside of the coverage of the eNB needs to be able to perform D2D communication with a UE located within the communication range thereof and outside of the coverage of the eNB. It is desirable that a UE located inside of the coverage of the eNB and performing D2D communication with a UE located outside of the coverage of the eNB perform communication with the eNB using some subframes and perform D2D communication using the remaining subframes. Particularly, it is desirable that the UE divide all uplink subframes into subframes to be used for communication with the eNB and subframes to be used for D2D communication and separately manage the subframes since the UE transmits a signal in D2D communication and thus uplink resources are preferably used for D2D communication.

Therefore, the eNB preferably designates subframes to be used for D2D communication for a UE located inside of the coverage of the eNB. The UE located inside of the coverage of the eNB needs to inform a UE located outside of the coverage of the eNB of the positions of the D2D subframes designated by the eNB in order to perform D2D communication with the UE located outside of the coverage of the eNB using the subframes designated by the eNB. Accordingly, the UE located inside of the coverage of the eNB is preferably set as a cluster head such that the UE can assign subframes and/or frequency resources to be used for D2D communication to UEs located outside of the coverage of the eNB.

A description will be given of a method for assigning, by a cluster head, positions of D2D resources to cluster members. When the eNB designates subframes to be used for D2D communication for a UE located inside of the coverage thereof, the following method may be applied while the eNB becomes a cluster head and the UE located inside of the coverage of the eNB becomes a cluster member.

If the cluster head is the UE located inside of the coverage of the eNB, subframes for uplink communication with the eNB need to be separated from subframes for D2D communication, as described above. In 3GPP LTE, uplink communication adopts the synchronous HARQ operation scheme, which means that a retransmission time of a PUSCH which has been transmitted at a specific time is predetermined.

Specifically, in an FDD system, a PUSCH transmitted in subframe #n is retransmitted in subframe #(n+8) after 8 ms from subframe #n, and thus uplink HARQ having periodicity of 8 ms is provided. In a TDD system, uplink HARQ periodicity is determined according to a UL/DL subframe configuration used as a reference of HARQ. Particularly, the uplink HARQ periodicity is 10 ms except in UL/DL subframe configuration #0 and UL/DL subframe configuration #6. In UL/DL subframe configuration #0 and UL/DL subframe configuration #6, positions of uplink subframes in which the same HARQ process appears are varied according to radio frame, which is a special form, and a pattern of appearance of the uplink subframe positions has periodicity of 70 ms and 60 ms.

In this situation, it is desirable to minimize the influence of subframes in which D2D communication is performed on uplink HARQ operation for smooth coexistence of a D2D communication link and an eNB-UE link with respect to the UE located inside of the coverage of the eNB.

Specifically, if the UE transmits a PUSCH to the eNB in subframe #n and then retransmits the PUSCH to the eNB in subframe #(n+k) due to error, when subframe #(n+k) is allocated for D2D communication, for example, D2D signal reception and/or D2D signal transmission, retransmission of the PUSCH cannot be performed or is remarkably restricted and delayed. Accordingly, to minimize such restriction, it is desirable to minimize the number of HARQ processes in which HARQ retransmission is delayed due to presence of a D2D subframe.

In other words, when a subframe for D2D communication (referred to as a D2D subframe hereinafter) is assigned, a subframe assigned as a D2D subframe is determined such that the subframe belongs to one HARQ process from the viewpoint of uplink HARQ so as to protect uplink HARQ processes using the remaining uplink subframes. Particularly, the position of a subframe belonging to one HARQ process depends on whether the duplex mode of a cell linked to a UE operating as a cluster head is FDD or TDD and which UL/DL subframe configuration is used for uplink HARQ operation in the case of TDD.

Therefore, the present invention proposes a method for appropriately controlling the position of a D2D subframe assigned by a cluster head to a cluster member according to situation.

Specifically, a field that specifies a duplex mode of a cell linked to the cluster head is inserted into a signal for assigning a D2D subframe, the D2D subframe is considered to be repeated in a period of 8 ms or a multiple of 8 ms when the field specifies the FDD mode, and the D2D subframe is considered to be repeated in a period of 10 ms or a multiple of 10 ms for at least part of UL/DL subframe configurations when the field specifies the TDD mode. Alternatively, it is possible to define an indicator indicating a period in which the D2D subframe repeatedly appears and an indicator indicating one of the periods of 8 ms and 10 ms, instead of directly specifying the duplex mode.

Figure 8:
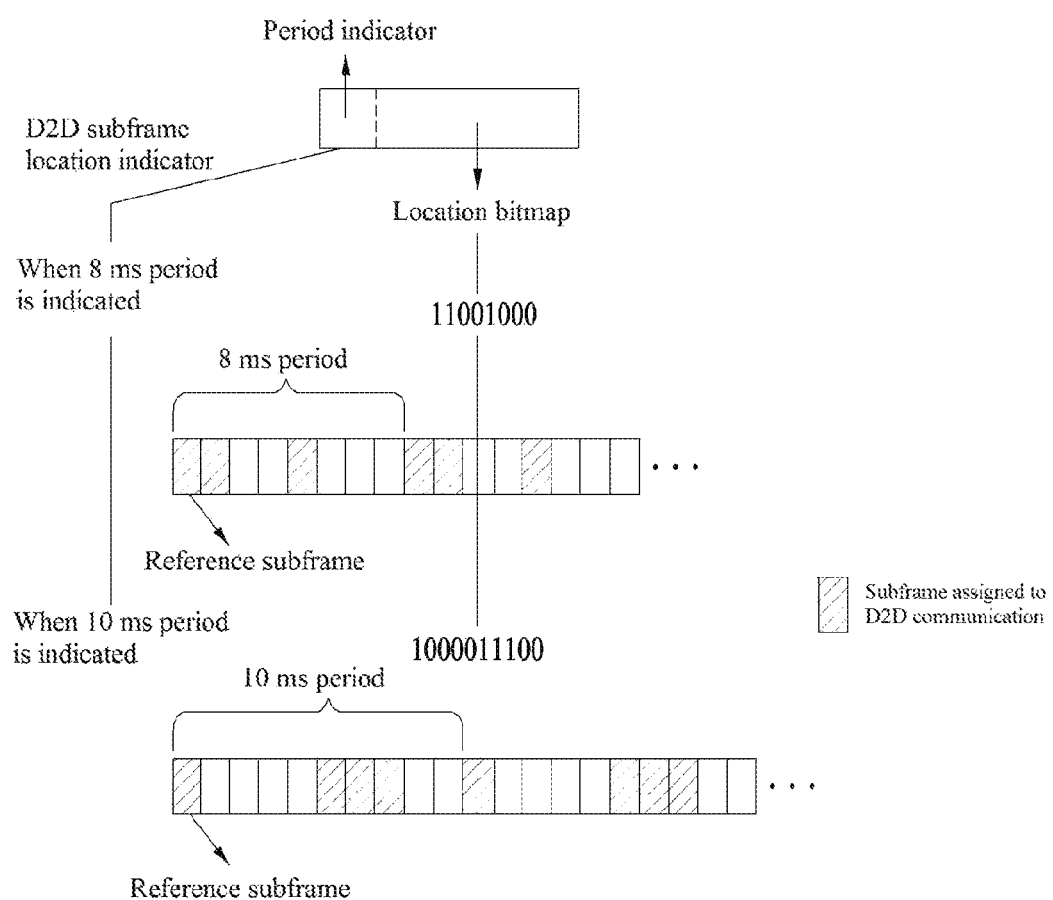
FIG. 8 illustrates an example in which a cluster head configures a signal for designating the position of a D2D subframe according to an embodiment of the present invention.

FIG. 8 illustrates an example in which the cluster head configures a signal that designates the position of a D2D subframe according to an embodiment of the present invention.

Referring to FIG. 8, the signal is configured in the form of a bit string, and whether a period in which the D2D subframe repeatedly appears is 8 ms or 10 ms is specified using some bits of the bit string. Here, the period can be represented using one bit. The remaining bits are used to designate the position of the D2D subframe.

Specifically, when the period of the D2D subframe is designated as 8 ms, the following bits can be 8 bits. Here, a k-th bit from among the 8 bits indicates whether the k-th subframe from a reference subframe has been allocated as a D2D subframe. For convenience of description, the first bit is regarded as a 0-th bit.

The reference subframe may be a subframe in which the signal for designating the D2D subframe position is received, a subframe in which the cluster head sets a cluster and transmits a signal (which can be referred to as a D2D synchronization signal) used as a reference signal for time/frequency synchronization or a subframe spaced apart from such subframe by a predetermined time, and the predetermined time may be transmitted in the form of a subframe offset indicator as a part of the signal for designating the position of the D2D subframe, which will be described later. If the eNB delivers information on the position of the D2D subframe to a UE located inside of the coverage thereof, since the UE has recognized subframe indices on the basis of a synchronization signal transmitted from the eNB, a subframe (e.g. subframe #0) having a specific index can be a reference subframe. The aforementioned scheme can be applied when the period of the D2D subframe is set to 10 ms. In this case, 10 bits may be used to indicate whether the corresponding subframe is allocated as a D2D subframe. FIG. 8 shows D2D subframe position bitmaps of {11001000} and {1000011100} which are respectively provided for the period of 8 ms and the period of 10 ms.

If the reference subframe for D2D subframe allocation is always assigned for D2D communication, the first bit of the D2D subframe position bitmap is always set to 1. Furthermore, signaling overhead can be reduced by omitting transmission of the first bit.

Even though D2D subframe allocation in a period of 10 ms is introduced for the TDD mode, if the UE located inside of the coverage of the eNB uses UL/DL subframe configuration #0 or UL/DL subframe configuration #6, uplink HARQ operation is still restricted. To solve this, it is possible to add a function of designating D2D subframe allocation suitable for UL/DL subframe configuration #0 or UL/DL subframe configuration #6 by extending the aforementioned period indicator.

For example, 2 bits are allocated to the period indicator and 4 states defined by the 2 bits are respectively assigned a D2D subframe period of 8 ms, a D2D subframe period of 10 ms, a period corresponding to UL/DL subframe configuration #0, that is, a D2D subframe allocation pattern repetition period of 70 ms and a period corresponding to UL/DL subframe configuration #6, that is, a D2D subframe allocation pattern repetition period of 60 ms so as to indicate a D2D subframe assignment period from among the 4 periods.

When the period of the D2D subframe can be set to multiples of 8 ms and 10 ms, the period indicator can be further extended to indicate which one of candidates including 8 ms, 10 ms and multiples thereof can be used as a D2D subframe period. For example, when 8 states are available for the period indicator, states indicating 8 ms and 10 ms corresponding to minimum periods and states indicating 60 ms and 70 ms for UL/DL subframe configuration #0 and UL/DL subframe configuration #6 are added. Then, the remaining 4 states are appropriately allocated to periods corresponding to multiples of 8 ms and 10 ms. That is, states indicating 16 ms and 20 ms corresponding to twice the minimum periods or 40 ms corresponding to the least common multiple of 8 ms and 10 ms can be added. In addition, a D2D subframe period indicated by each state of the period indicator may be determined according to various combinations other than the aforementioned ones and the D2D subframe period may include values other than multiples of 8 ms or 10 ms if more bits can be allocated to the period indicator.

The period indicator corresponding to UL/DL subframe configuration #0 can use 6 bits since subframe sets used by a single uplink HARQ process are allocated for D2D and 6 uplink subframes are present in the corresponding UL/DL subframe configuration. This means that the bitmap for D2D subframes is applied to only uplink of UL/DL subframe configuration #0. Specifically, if the reference subframe is subframe #n and subframe #2 of a specific radio frame always becomes the reference subframe, when a k'-th bit of the D2D subframe position bitmap is set to 1, the following subframes are allocated as D2D subframes.

When k'=0, subframes #(n+70*i), #(n+70*i+11), #(n+70*i+22), #(n+70*i+35), #(n+70*i+46) and #(n+70*i+57)

When k'=1, subframes #(n+70*i+1), #(n+70*i+12), #(n+70*i+25), #(n+70*i+36), #(n+70*i+47) and #(n+70*i+60)

When k'=2, subframes #(n+70*i+2), #(n+70*i+15), #(n+70*i+26), #(n+70*i+37), #(n+70*i+50) and #(n+70*i+61)

When k'=3, subframes #(n+70*i+5), #(n+70*i+16), #(n+70*i+27), #(n+70*i+40), #(n+70*i+51) and #(n+70*i+62)

When k'=4, subframes #(n+70*i+6), #(n+70*i+17), #(n+70*i+30), #(n+70*i+41), #(n+70*i+52) and #(n+70*i+65)

When k'=5, subframes #(n+70*i+7), #(n+70*i+20), #(n+70*i+31), #(n+70*i+42), #(n+70*i+55) and #(n+70*i+66)

Here, i may be an integer equal to or greater than 0.

Alternatively, a subframe offset indicator may be defined and the position of the reference subframe may be controlled to correspond to an arbitrary subframe in the corresponding UL/DL subframe configuration. For example, which one of 6 subframes #2, #3, #4, #7, #8 and #9 designated as uplink subframes in UL/DL subframe configuration #0 is the reference subframe can be indicated by the subframe offset indicator. If an x-th uplink subframe is designated as the reference subframe and a k-th bit of the subframe allocation bitmap is set to 1, which subframes are allocated for D2D communication can be detected by applying k'=(k+x) mod 6 to subframe set allocation in which uplink subframe #2 is assumed to be the reference subframe. Accordingly, the subframe offset indicator can be considered to indicate a time when the D2D subframe position bitmap starts.

For example, when k=4 and x=3, which means that the cluster head sets subframe #7 corresponding to (x=3)-th uplink subframe from subframe #2 as the reference subframe, a series of uplink subframes starting with subframe #3 corresponding to the (k=4)-th uplink subframe from the reference subframe is allocated as D2D subframes. Accordingly, subframes #(n+70*i+1), #(n+70*i+12), #(n+70*i+25), #(n+70*i+36), #(n+70*i+47) and #(n+70*i+60) corresponding to k'=1 are allocated for D2D communication. Such D2D subframe allocation corresponds to a case in which a subframe set starting with subframe #3 corresponding to the (k'=1)-th uplink subframe is allocated for D2D communication when the reference subframe is subframe #2.

To sustain the aforementioned operation, the cluster head UE needs to maintain the reference subframe as a subframe corresponding to 70 ms or a multiple thereof. If the reference subframe is defined as a subframe in which a specific signal is transmitted, this means that the specific signal defining the reference subframe can be transmitted by the cluster head only at a time corresponding to 70 ms or a multiple thereof.

The present invention is applicable when a D2D subframe appears in a period corresponding to UL/DL subframe configuration #6. In this case, 5 uplink subframes are present and thus D2D subframe positions can be designated using a 5-bit indicator. This means that the bitmap for the D2D subframe is applied only to uplink of UL/DL subframe configuration #6. When the k'-th bit is set to 1 on the assumption that reference subframe #n corresponds to subframe #2 in a specific radio frame, a set of uplink subframes starting with the k'-th uplink subframe from the reference subframe can be considered to be allocated for D2D communication.

When k'=0, subframes #(n+60*i), #(n+60*i+11), #(n+60*i+22), #(n+60*i+35) and #(n+60*i+46)

When k'=1, subframes #(n+60*i+1), #(n+60*i+12), #(n+60*i+25), #(n+60*i+36) and #(n+60*i+50)

When k'=2, subframes #(n+60*i+2), #(n+60*i+15), #(n+60*i+26), #(n+60*i+40) and #(n+60*i+51)

When k'=3, subframes #(n+60*i+5), #(n+60*i+16), #(n+60*i+30), #(n+60*i+41) and #(n+60*i+52)

When k'=4, subframes #(n+60*i+6), #(n+60*i+20), #(n+60*i+31), #(n+60*i+42), #(n+60*i+55)

The subframe offset indicator may be additionally defined and the position of the reference subframe may be controlled to correspond to an arbitrary subframe in the corresponding UL/DL subframe configuration. For example, which one of 6 subframes #2, #3, #4, #7, #8 and #9 designated as uplink subframes in UL/DL subframe configuration #6 is the reference subframe can be indicated by the subframe offset indicator. If an x-th uplink subframe is designated as the reference subframe and the k-th bit of the subframe allocation bitmap is set to 1, which subframes are allocated for D2D communication can be detected by applying k'=(k+x) mod 5 to subframe set allocation in which uplink subframe #2 is assumed to be the reference subframe. However, to sustain the aforementioned operation, the cluster head UE needs to maintain the reference subframe as a subframe corresponding to 60 ms or a multiple thereof. If the reference subframe is defined as a subframe in which a specific signal is transmitted, this means that the specific signal defining the reference subframe can be transmitted by the cluster head only at a time corresponding to 60 ms or a multiple thereof.

The aforementioned D2D subframe indication method is based on the assumption that a period in which a D2D subframe designation pattern is repeated corresponds to an uplink HARQ period. If the period in which the D2D subframe designation pattern is repeated is a multiple of the uplink HARQ period, the length of the bitmap indicating D2D subframe positions may increase in order to process the difference between the periods. For example, the D2D subframe designation pattern can be formed using 8 bits if the pattern is repeated in a period of 8 ms. However, if the pattern is repeated in a period of 8*Y ms, the bitmap needs to increase to 8*Y bits. Here, Y is a value indicating the ratio of the uplink HARQ period to the D2D subframe designation pattern repetition period. In view of this, the D2D subframe designation pattern repetition period may be defined as a parameter indicating the length (i.e. the number of bits) of the bitmap indicating the D2D subframe designation pattern.

The aforementioned principle is applicable to a case in which a D2D subframe period of 10 ms, a period corresponding to UL/DL subframe configuration #0 and a period corresponding to UL/DL subframe configuration #6 are provided. Particularly, when the period corresponding to UL/DL subframe configuration #0 and the period corresponding to UL/DL subframe configuration #6 are indicated, the D2D subframe becomes 70 ms and 60 ms and thus the same principle as that in the case of a period of 10*Y ms corresponding to a multiple of 10 ms can be applied. Specifically, bitmaps indicating D2D subframes can be generated using 70 bits and 60 bits (that is, Y is set to 7 and 6) and can be repeated at predetermined periods. Alternatively, since operation can be performed only using 6 bits and 5 bits per radio frame in UL/DL subframe configurations #0 and #6 in which 6 uplink subframes and 5 uplink subframes are respectively present in one radio frame corresponding to 10 ms according to the aforementioned scheme, 42 bits and 30 bits are respectively needed to set the D2D subframe period to 70 ms and 60 ms in the two UL/DL subframe configurations.

In the case of a period corresponding to a multiple of 10 ms, if the period is used in the TDD mode only, subframes designated as downlink subframes all the time cannot become D2D subframes and thus the subframes can be excluded from the bitmap for D2D subframe position designation. Such subframes include subframes #0, #1, #5 and #6. Accordingly, in the case of the period of 10 ms, subframes designated as D2D subframes correspond to subframes #2, #3, #4, #7, #8 and #9 each of which is 6 bits.

A description will be given of interpretation and utilization of the subframe offset indicator. As described above, when the duplex mode corresponds to the TDD mode, the subframe offset indicator can indicate the position of the reference subframe in a UL/DL subframe configuration in which the cluster head communicates with the eNB. Accordingly, the cluster head UE can make the position of a subframe, which is used by a UE linked thereto for D2D communication, correspond to the position of a D2D subframe in a subframe configuration in which the cluster head UE communicates with the eNB.

In addition, the subframe offset indicator serves to inform UEs linked to the cluster head of the position of the reference subframe in a subframe configuration in which the cluster head communicates with the eNB. As described above, the reference subframe interpreted by the cluster head and UEs linked thereto can be a subframe in which a D2D subframe position designation signal is received, a subframe in which a reference signal used by the cluster head for time/frequency synchronization or a subframe spaced apart from such subframe by a predetermined time.

The subframe offset indicator may be considered to indicate the subframe index of the reference subframe in the subframe configuration in which the cluster head communicates with the eNB. A UE linked to the cluster head cannot be aware of the subframe index of the reference subframe in the subframe configuration in which the cluster head communicates with the eNB only by being connected to the cluster head. Accordingly, even if the UE acquires information representing that subframe #y is set to a D2D subframe according to the aforementioned D2D subframe bitmap, the UE cannot be aware of the position of subframe #y. To solve this, the subframe offset indicator is additionally defined to indicate the subframe index of the reference subframe such that the UE linked to the cluster head recognizes a period set to a D2D subframe. The subframe offset indicator may indicate a period from a predetermined specific time (e.g. a time designated by the eNB as subframe #0).

For example, when operation is performed in the period corresponding to UL/DL subframe configuration #0, setting the subframe offset indicator to x means that the subframe index of the reference subframe is 2+x if x<3 and 4+x if not since UL/DL subframe configuration #0 includes 6 uplink subframes #2, #3, #4, #7, #8 and #9. In the TDD mode, the subframe offset indicator may operate to indicate positions of uplink subframes in a designated UL/DL subframe configuration or to simply designate the subframe index of the reference subframe.

Particularly, the latter case is applicable to the FDD mode. That is, if uplink subframe #n defined through communication between the cluster head and the eNB is set to the reference subframe, the subframe offset indicator can be set to n so as to inform UEs connected to the cluster head of the index of the reference subframe. Since a UE connected to the cluster head needs to recognize subframe index information during a synchronization acquisition process, the subframe offset indicator is preferably transmitted in a subframe through which the reference signal for time/frequency synchronization is delivered. D2D subframe indication signaling other than the subframe offset indicator is not mandatory in the synchronization process. Accordingly, the subframe offset indicator may be transmitted even in a subframe other than the aforementioned reference signal transmission subframe for more flexible application.

While the subframe index has been used, this is exemplary and may include an index of a time resource in an arbitrary form. Particularly, indexing of time periods corresponding to one or more radio frames through one signaling may be needed as in the case in which D2D subframes are allocated according to UL/DL subframe configuration #0 or UL/DL subframe configuration #6. In this case, the subframe index can be defined over a plurality of radio frames. For example, N radio frames can be grouped into one unit and an m-th subframe of an n-th radio frame can be designated as subframe index 10*n+m. Here, N may be a subframe offset indicator transmission period. In this case, a maximum value of the subframe offset indicator can be 10*N−1. If the position of the reference subframe in a radio frame is fixed, as described above, it is possible to signal only the index of the radio frame in which the reference subframe is located instead of signaling the index of the reference subframe.

Even a UE located outside of the coverage of the eNB can become a cluster head for D2D communication with a neighboring UE and perform operation similar to operation of a UE located inside of the coverage of the eNB. In this case, however, the aforementioned subframe offset indicator is unnecessary since the index of an uplink subframe for communication with the eNB is not present. The index of the reference subframe may be prefixed to a specific value and the corresponding field may be omitted in signaling or the corresponding field may be fixed to a specific value so as to reduce signaling overhead or increase detection probability. Since the cluster head indicates whether the cluster head is located inside or outside of the coverage through additional signaling, a UE connected to the cluster head can recognize whether the cluster head is located inside or outside of the coverage and then appropriately detect the subframe offset indicator according to the location of the cluster head.

To add various subframe allocation combinations to the aforementioned D2D subframe indication method, an indicator indicating the number of times of repeating a D2D subframe allocation pattern may be added. That is, when a D2D subframe is allocated and an X-bit bitmap is used to designate the position of the D2D subframe, if Y repetitions are designated through the indicator, the X-bit bitmap is repeated Y times to designate allocation of a total of X*Y subframes as D2D subframes. Cluster member UEs can be aware of a D2D subframe allocation end time through the indicator and the cluster head can transmit an additional D2D subframe allocation signal at the end time and provide newly changed D2D subframe allocation information to the cluster member UEs through the additional D2D subframe allocation signal.

If the additional D2D subframe allocation signal is not present, D2D subframe allocation may be repeated in a period of P ms, for example, which is greater than X*Y ms and predetermined or signaled by the cluster head. In this case, when the X-bit bitmap is repeated Y times, D2D subframe allocation is repeated in the period of P ms. When all uplink subframes belonging to one HARQ process are allocated to D2D communication and thus it is difficult to process given D2D traffic, it may be desirable to allocate only some uplink subframes to D2D communication. In this case, D2D subframes allocated for actual D2D communication, from among designated D2D subframes, can be indicated using an additional indicator.

For example, when subframes belonging to one HARQ process are designated as D2D subframes, the frequency of subframes allocated as actual D2D subframes, from among subframes belonging to each HARQ process, can be indicated through the additional indicator. When a series of subframes appearing in a period of 8 ms is designated as D2D subframes in the FDD mode, for example, if the additional indicator indicates that only one of Y subframes belonging to one HARQ process is allocated as an actual D2D subframe, the subframe allocated to the actual D2D subframe appears in a period of 8*Y ms.

In addition, the cluster head may designate a set of subframes in which the same information is repeatedly transmitted from among D2D subframes using an additional indicator. For example, when a series of subframes is allocated as D2D subframes according to the aforementioned principle, the cluster head can group n consecutive subframes from among the D2D subframes and define the grouped D2D subframes such that the same information is repeatedly transmitted therein. This scheme can be effectively used when stable transmission and reception are impossible through one-time information transmission due to a long distance between D2D UEs. When such repeated transmission is applied, if small packets such as those used in a voice service arrive in a relatively short period, it is possible to minimize time resources used for transmission while increasing the transmission distance by grouping a plurality of packets to form one large packet and repeatedly transmitting the packet in a plurality of subframes.

Repeated transmission of the same information in a plurality of subframes may mean repetition of the same physical signal in the plurality of subframes. Otherwise, this may mean an operation of transmitting bits of the same information, which are different from encoded bits derived from a channel encoder, in the subframes, combining the transmitted bits by a receiver to generate a single long encoded bitstream and performing channel-decoding.

Alternatively, the indicator indicating the number of subframes in which the same information is repeated may be omitted and the same information may be repeated in all subframes designated as D2D transmission subframes of the cluster head by the cluster head in a predetermined period. That is, a D2D subframe designation message is used to designate not only the position of a subframe in which D2D communication may be performed but also the position of a subframe in which the same information is repeatedly transmitted.

For example, when two subframes are allocated as D2D subframes in a period of 8 ms in the aforementioned embodiment in which D2D subframe allocation is performed in a period of 8 ms, this is interpreted as repetition of the same information in the two subframes by the cluster head in a period of 8 ms. Even in this case, different pieces of information are repeatedly transmitted in two subframes appearing in the next period of 8 ms.

A description will be given of a method of using D2D subframes designated according to the aforementioned principle for actual D2D transmission or reception according to an embodiment of the present invention.

D2D subframes designated by the aforementioned method may be defined such that the D2D subframes refer to a set of subframes that can be used by UEs belonging to the corresponding cluster for D2D transmission and reception. That is, when a specific D2D subframe set is designated, a specific UE can transmit and receive D2D signals in the specific D2D subframe set. In other words, signal transmission and signal reception of each UE are not discriminated from each other from the viewpoint of D2D subframe designation. For example, when a plurality of UEs is configured to stochastically perform transmission and reception, a UE having data to be transmitted stochastically can attempt signal transmission in the designated D2D subframe set and, upon determining that signal transmission is not performed, perform reception operation in expectation of signal transmission of another UE.

Alternatively, a series of D2D subframes designated according to the aforementioned principle may be used to designate a subframe in which the corresponding cluster head can transmit a D2D signal. Upon reception of the D2D subframes, a cluster member UE can recognize the fact that the cluster head can transmit a signal in the designated subframe and perform reception operation. Here, cluster members may need to perform D2D signal transmission. To this end, the cluster head may designate an additional D2D subframe set through additional indication and instruct the cluster members to perform D2D signal transmission in the designated subframes. In other words, the cluster member UEs are prevented from transmitting D2D signals in subframes other than the D2D signal transmission subframes designated by the cluster head at least under the control of the cluster head. For example, transmission of D2D signals that need to be received by the cluster head is prevented. This scheme can be used to designate subframes free from interference with an uplink signal transmitted from the cluster head to the eNB for D2D signal transmission of the cluster members when the cluster head performs normal uplink signal transmission with the eNB in the coverage of the eNB.

Particularly, the operation of designating subframes in which cluster member UEs (or D2D UEs other than the cluster head, which transmit corresponding signals) can transmit D2D signals may be limited to UEs located inside of the coverage of the eNB. To this end, a synchronization signal transmitted by the cluster head located inside of the coverage of the eNB may be discriminated from synchronization signals in other cases, or specific information is added to a D2D subframe allocation message such that UEs located outside of the coverage of the eNB can recognize whether the cluster head is located inside of the coverage and, if a specific UE determines that the cluster head is located inside of the coverage, the specific UE may additionally detect the aforementioned additional D2D subframe designation field to recognize a resource that can be used for D2D signal transmission thereof.

If a UE located outside of the coverage of the eNB separately forms a cluster in which the UE becomes a cluster head and designates the position of a resource in which D2D signal transmission is performed, the position of the resource needs to be included in a set of subframes in which the UE located outside of the coverage can transmit D2D signals, designated by the cluster located inside of the coverage. Clusters may be formed by a plurality of UEs located outside of the coverage using a set of subframes in which one UE outside of the coverage can transmit a D2D signal, which is designated by the cluster head located inside of the coverage. Here, it is desirable that the clusters generated by the UEs have subframes which do not overlap.

When the cluster head UE located inside of the coverage designates a subframe set to be used for D2D signal transmission thereof and/or a subframe set to be used for D2D signal transmission of other UEs located outside of the coverage, information about the subframe sets may be information which is designated by the eNB through higher layer signaling such as RRC signaling. In other words, the eNB controls subframes in which UEs located outside of the coverage thereof can transmit D2D signals, through the cluster head UE located inside of the coverage, so as to control interference due to D2D transmission of the UEs located outside of the coverage.

To enable more flexible D2D subframe designation, the aforementioned methods may be combined.

D2D subframes may be additionally classified according to types of D2D signals transmitted in corresponding subframes. For example, the D2D subframes can be classified into a discovery subframe for transmission and reception of a discovery signal including ID information of an individual UE, a communication data subframe for transmission and reception of user data, and scheduling assignment subframe for communication scheduling assignment including control information about communication data. In this case, the aforementioned methods can be applied depending on D2D subframe type since different types of D2D subframes will use different amounts of time resources.

Figure 9:
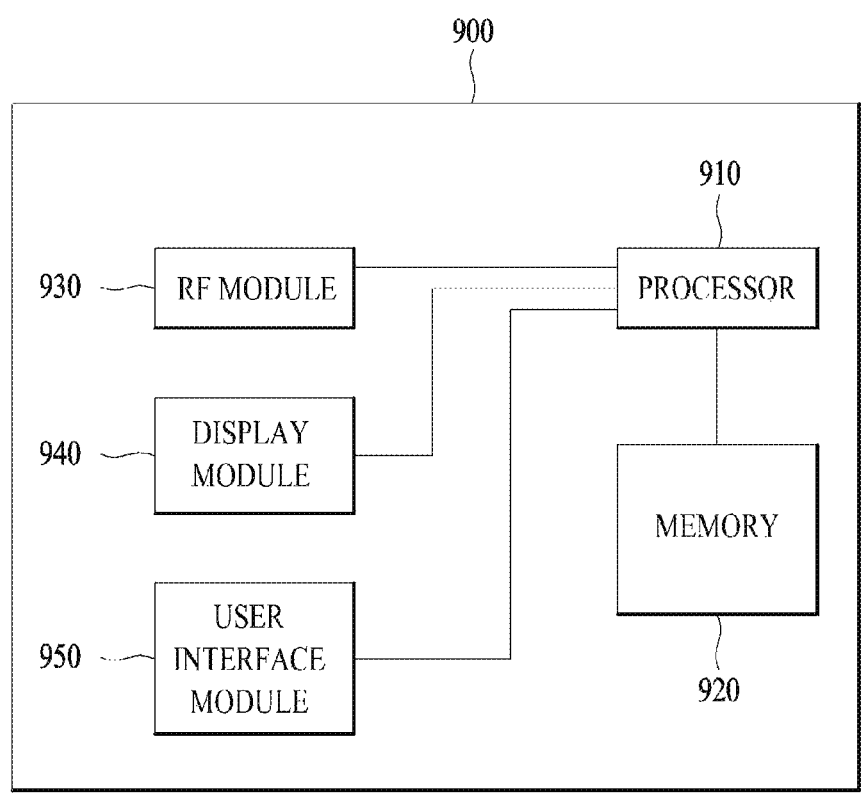
FIG. 9 is a block diagram of a communication apparatus according to an embodiment of the present invention.

FIG. 9 is a block diagram of a structure of a communication device 900 according to an embodiment of the present invention.

Referring to FIG. 9, the communication device 900 includes a processor 910, a memory 920, an RF module 930, a display module 940, and a user interface module 950.

The communication device 900 is illustrated for convenience of description and some modules may not be omitted. The communication device 900 may further include necessary modules. In addition, some modules of the communication device 900 may be subdivided. The processor 910 is configured to perform operations according to the embodiment of the present invention that is exemplified with reference to the diagrams. In detail, a detailed operation of the processor 910 would be understood with reference to FIGS. 1 to 8.

The memory 920 is connected to the processor 910 and stores an operating system, an application, a program code, data, etc. The RF module 930 is connected to the processor 910 and converts a baseband signal into a radio signal or converts a radio signal into a baseband signal. To this end, the RF module 930 performs analog conversion, amplification, filtering, and frequency up-conversion, or inverse procedures thereof. The display module 940 is connected to the processor 910 and displays various pieces of information. The display module 940 may use, but is not limited to, well-known elements such as a liquid crystal display (LCD), a light emitting diode (LED), and an organic light emitting diode (OLED). The user interface module 950 may be connected to the processor 910 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged.

Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the resource allocation method for D2D communication in a wireless communication system and the apparatus for the same have been described based on 3GPP LTE, the resource allocation method and the apparatus for the same are applicable to various wireless communication systems other than 3GPP LTE.

What is claimed is:

1. A method for transmitting signals for a device-to-device (D2D) link at a user equipment (UE) in a wireless communication system, the method comprising:
receiving both a synchronization signal for time/frequency synchronization and index information identifying a reference subframe in the reference subframe identified by the index information;
receiving a subframe bitmap indicating a plurality of subframes for the D2D link; and
transmitting D2D link signals on at least one of D2D subframes determined using the index information on the reference subframe and the subframe bitmap.

2. The method of claim 1, wherein the index information on the reference subframe includes a frame index and a subframe index of the reference subframe.

3. The method of claim 1, wherein a bit size of the subframe bitmap is defined based on whether a duplex mode of the wireless communication system is a FDD (Frequency Division Duplex) mode or a TDD (Time Division Duplex) mode.

4. The method of claim 3, wherein, if the duplex mode is the TDD mode, the bit size of the subframe bitmap is defined according to a UL/DL (Uplink/Downlink) configuration applied to the wireless communication system.

5. The method of claim 1, wherein a bit size of the subframe bitmap is defined according to an uplink Hybrid Automatic Repeat and request (HARQ) period.

6. A user equipment (UE) in a wireless communication system, the UE comprising: a radio frequency (RF) module configured for transmitting/receiving signals to/from a base station (BS) via a downlink/an uplink or another UE via a device-to-device (D2D) link; and a processor configured for processing the signals, wherein the processor controls the RF module to:
receive both a synchronization signal for time/frequency synchronization and index information identifying a reference subframe in the reference subframe identified by the index information,
receive a subframe bitmap indicating a plurality of subframes for the D2D link, and
transmit D2D link signals on at least one of D2D subframes determined using the index information on the reference subframe and the subframe bitmap.

7. The UE of claim 6, wherein the index information on the reference subframe includes a frame index and a subframe index of the reference subframe.

8. The UE of claim 6, wherein a bit size of the subframe bitmap is defined based on whether a duplex mode of the wireless communication system is a FDD (Frequency Division Duplex) mode or a TDD (Time Division Duplex) mode.

9. The UE of claim 8, wherein, if the duplex mode is the TDD mode, the bit size of the subframe bitmap is defined according to a UL/DL (Uplink/Downlink) configuration applied to the wireless communication system.

10. The UE of claim 6, wherein a bit size of the subframe bitmap is defined according to an uplink Hybrid Automatic Repeat and request (HARQ) period.

* * * * *